United States Patent
Hamada et al.

(10) Patent No.: US 9,707,893 B2
(45) Date of Patent: Jul. 18, 2017

(54) VEHICLE MIRROR DEVICE

(71) Applicant: KABUSHIKI KAISHA TOKAI-RIKA-DENKI-SEISAKUSHO, Aichi-ken (JP)

(72) Inventors: Takehiro Hamada, Aichi-ken (JP); Masakazu Iwatsuki, Aichi-ken (JP)

(73) Assignee: KABUSHIKI KAISHA TOKAI-RIKA-DENKI-SEISAKUSHO, Aichi-Ken (JP)

(*) Notice: Subject to any disclaimer, the term of this patent is extended or adjusted under 35 U.S.C. 154(b) by 116 days.

(21) Appl. No.: 14/071,144

(22) Filed: Nov. 4, 2013

(65) Prior Publication Data
US 2014/0124643 A1    May 8, 2014

(30) Foreign Application Priority Data

Nov. 8, 2012 (JP) .................................. 2012-246698

(51) Int. Cl.
*A47G 1/24* (2006.01)
*B60R 1/02* (2006.01)
(Continued)

(52) U.S. Cl.
CPC ............ *B60R 1/074* (2013.01); *B60R 1/0617* (2013.01); *B60R 1/006* (2013.01); *B60R 1/06* (2013.01);
(Continued)

(58) Field of Classification Search
CPC ......... B60R 1/06; B60R 1/074; B60R 1/0617; B60R 1/12; B60R 1/0605; B60R 1/076;
(Continued)

(56) References Cited

U.S. PATENT DOCUMENTS 2,724,996 A * 11/1955 O'Shei ...................... B60R 1/06
                                                                               248/160
4,789,232 A * 12/1988 Urbanek ...................... 248/549
(Continued)

FOREIGN PATENT DOCUMENTS

JP          7-69133 A    3/1995
JP       H07-042724    8/1995
(Continued)

OTHER PUBLICATIONS

JP office action dated Oct. 21, 2014 and English translation of Notice of Reasons for Rejection.

*Primary Examiner* — Jonathan Liu
*Assistant Examiner* — Taylor Morris
(74) *Attorney, Agent, or Firm* — Roberts Mlotkowski Safran Cole & Calderon P.C.

(57) ABSTRACT

Deformation of an assembly portion side portion of a rotating portion is suppressed in a rotating mechanism. In a vehicle door mirror device, a case rotates with respect to an assembly portion of a stand on actuation of a stowage mechanism, thereby rotating a bracket and a mirror integrally with the case. The case is housed inside a housing sleeve of the bracket from the lower side. A reinforcement is fixed to the lower side of the case, the reinforcement thereby restricting deformation of a lower side portion of the case. Vibration deformation of the lower side portion of the case due for example to vibration of the vehicle can accordingly be suppressed, enabling the occurrence of chattering of the mirror to be suppressed.

16 Claims, 3 Drawing Sheets

(51) Int. Cl.

| | | |
|---|---|---|
| *B60R 1/074* | (2006.01) | |
| *A47F 1/14* | (2006.01) | |
| *A47G 1/16* | (2006.01) | |
| *F16M 13/00* | (2006.01) | |
| *B62C 1/00* | (2006.01) | |
| *B60J 5/00* | (2006.01) | |
| *G02B 5/08* | (2006.01) | |
| *G02B 7/18* | (2006.01) | |
| *G02B 7/182* | (2006.01) | |
| *B60R 1/06* | (2006.01) | |
| *F16M 11/18* | (2006.01) | |
| *B60R 1/12* | (2006.01) | |
| *F16M 13/02* | (2006.01) | |
| *B60R 1/00* | (2006.01) | |
| *B60R 1/076* | (2006.01) | |
| *B60R 1/08* | (2006.01) | |
| *B60R 1/078* | (2006.01) | |

(52) U.S. Cl.
CPC ............. *B60R 1/076* (2013.01); *B60R 1/078* (2013.01); *B60R 1/08* (2013.01); *B60R 1/12* (2013.01); *F16M 11/18* (2013.01); *F16M 13/02* (2013.01); *F16M 13/022* (2013.01)

(58) Field of Classification Search
CPC .. B60R 1/078; B60R 1/08; B60R 7/04; B60R 7/043; B60R 7/046; B60R 7/081; B60R 7/082; G02B 7/182; F16M 13/02; F16M 11/18; F16M 13/022
USPC ..... 248/549, 466, 475.1, 476, 479; 359/841, 359/872; 296/1.11, 146.6
See application file for complete search history.

(56) References Cited

U.S. PATENT DOCUMENTS

| | | | | |
|---|---|---|---|---|
| 6,022,113 | A * | 2/2000 | Stolpe et al. | 359/841 |
| 6,239,928 | B1* | 5/2001 | Whitehead et al. | 359/871 |
| 6,260,977 | B1* | 7/2001 | Inagaki | 359/879 |
| 6,648,294 | B2* | 11/2003 | Kato et al. | 248/479 |
| 6,712,329 | B2* | 3/2004 | Ishigami | B60R 1/06 248/475.1 |
| 6,742,756 | B1* | 6/2004 | Fimeri et al. | 248/479 |
| 7,156,449 | B2* | 1/2007 | Vijaywargiya et al. | 296/146.6 |
| 7,207,684 | B2* | 4/2007 | Huprikar | B60R 1/076 248/479 |
| 7,490,946 | B1* | 2/2009 | Foote et al. | 359/841 |
| 7,887,202 | B1* | 2/2011 | Peterson | 359/841 |
| 2010/0296185 | A1* | 11/2010 | Itoh et al. | 359/841 |
| 2011/0204667 | A1* | 8/2011 | Suzuki | 296/1.11 |
| 2013/0043362 | A1* | 2/2013 | Courbon | B60R 1/076 248/289.11 |

FOREIGN PATENT DOCUMENTS

| | | |
|---|---|---|
| JP | 2002274266 | 9/2002 |
| JP | 2008062903 | 3/2008 |

* cited by examiner

VEHICLE MIRROR DEVICE

CROSS-REFERENCE TO RELATED APPLICATION

This application claims priority under 35 USC 119 from Japanese Patent Application No. 2012-246698 filed Nov. 8, 2012, the disclosure of which is incorporated by reference herein.

BACKGROUND OF THE INVENTION

Field of the Invention

The present invention relates to a vehicle mirror device in which a vehicle mirror is stowed in and stands out.

Related Art

In an electric stowing type door mirror disclosed in Japanese Patent Application Laid-Open (JP-A) No. H7-69133, a mirror is supported by an attachment portion, and an accommodation portion is fixed to the attachment portion. The accommodation portion is supported by a shaft holder. The accommodation portion rotates with respect to the shaft holder to turn the attachment portion, rotating the mirror between an in-use position and a stowed position.

However in such an electric stowing type door mirror, the lower side of the accommodation portion is not covered by the attachment portion since the accommodation portion is inserted from the lower side inside a base body (an insertion hole and a fitting hole) of the attachment portion. There is accordingly a possibility of the lower side portion of the accommodation portion deforming due to for example vibration or the like of the vehicle, and chattering of the mirror occurring, in a case in which the rigidity of a lower side portion of the accommodation portion is not sufficiently high.

SUMMARY OF THE INVENTION

In consideration of the above circumstances, the present invention obtains a vehicle mirror device capable of suppressing deformation of an assembly portion side portion of a rotating portion in a rotating mechanism.

A vehicle mirror device of a first aspect includes: a rotating mechanism at which an assembly portion that is assembled to a vehicle body side and a rotating portion that is capable of rotating with respect to the assembly portion are provided; a support body at which a housing portion in which the rotating portion is housed from a side of the assembly portion is provided, that supports a vehicle mirror, and that is rotated by rotating the rotating portion with respect to the assembly portion such that the mirror is stowed in or stands out; and a restriction member that is disposed at the rotating portion at the side of the assembly portion, and that restricts deformation of a portion of the rotating portion at the side of the assembly portion.

A vehicle mirror device of a second aspect is the vehicle mirror device of the first aspect, wherein the portion of the rotating portion at the side of the assembly portion is fixed to the support body.

A vehicle mirror device of a third aspect is the vehicle mirror device of either the first aspect or the second aspect, wherein the restriction member extends around a circumferential direction of rotation of the rotating portion.

A vehicle mirror device of a fourth aspect is the vehicle mirror device of any one of the first aspect to the third aspect, wherein the restriction member is disposed at the rotating portion at a side opposite to a side of the mirror.

A vehicle mirror device of a fifth aspect is the vehicle mirror device of any one of the first aspect to the fourth aspect, wherein the restriction member is fixed to the rotating portion at a plurality of locations in a standing out direction of the mirror.

A vehicle mirror device of a sixth aspect is the vehicle mirror device of any one of the first aspect to the fifth aspect, further including: a projecting portion that is provided at the rotating portion and that projects further towards the side of the assembly portion than the restriction member; and a covering member that is anchored to a portion of the projecting portion, which is further to the side of the assembly portion than the restriction member, and that covers the support body.

In the vehicle mirror device of the first aspect, the assembly portion is attached to the vehicle body side, and the rotating portion is capable of rotating with respect to the assembly portion in the rotating mechanism. The rotating portion is moreover housed in the housing portion of the support body, and the support body supports the mirror such that the support body rotates when the rotating portion is rotated with respect to the assembly portion, and the mirror is stowed in or stands out.

Note that the rotating portion is housed in the housing portion from the side of the assembly portion.

The restriction member is disposed at the assembly portion side of the rotating portion and restricts deformation of the assembly portion side portion of the rotating portion. Deformation of the assembly portion side portion of the rotating portion can accordingly be suppressed.

In the vehicle mirror device of the second aspect, the assembly portion side portion of the rotating portion is fixed to the support body. The support body can accordingly restrict deformation of the assembly portion side portion of the rotating portion, enabling deformation of the assembly portion side portion of the rotating portion to be further suppressed.

In the vehicle mirror device of the third aspect, the restriction member extends around the circumferential direction of rotation of the rotating portion. The restriction member can accordingly effectively restrict deformation of the assembly portion side portion of the rotating portion, enabling deformation of the assembly portion side portion of the rotating portion to be effectively suppressed.

In the vehicle mirror device of the fourth aspect, the restriction member is disposed on the opposite side of the rotating portion to the mirror. The restriction member can accordingly effectively restrict deformation of the assembly portion side portion of the rotating portion due to load from the mirror, enabling deformation of the assembly portion side portion of the rotating portion to be effectively suppressed.

In the vehicle mirror device of the fifth aspect, the restriction member is fixed to the rotating portion at plural locations in the standing out direction of the mirror. The restriction member can accordingly effectively restrict deformation of the assembly portion side portion of the rotating portion due to load from the mirror, enabling deformation of the assembly portion side portion of the rotating portion to be effectively suppressed.

In the vehicle mirror device of the sixth aspect, the covering member is anchored to the projecting portion of the rotating portion and covers the support body.

The projecting portion projects further towards the assembly portion side than the restriction member, and the covering member is anchored to the portion of the projecting portion further to the assembly portion side than the restriction member. An increase in size of the portion of the projecting portion to which the covering member is anchored can accordingly be suppressed in the vehicle mirror device due to the restriction member, thereby enabling an increase in the degrees of freedom for design of the vehicle mirror device.

BRIEF DESCRIPTION OF THE DRAWINGS

Embodiments of the invention will be described in detail with reference to the following figures, wherein:

FIG. 2A is a perspective view as viewed from a lower side and FIG. 2B is a plan view as viewed from an upper side.

DETAILED DESCRIPTION OF THE INVENTION

Figure 1:
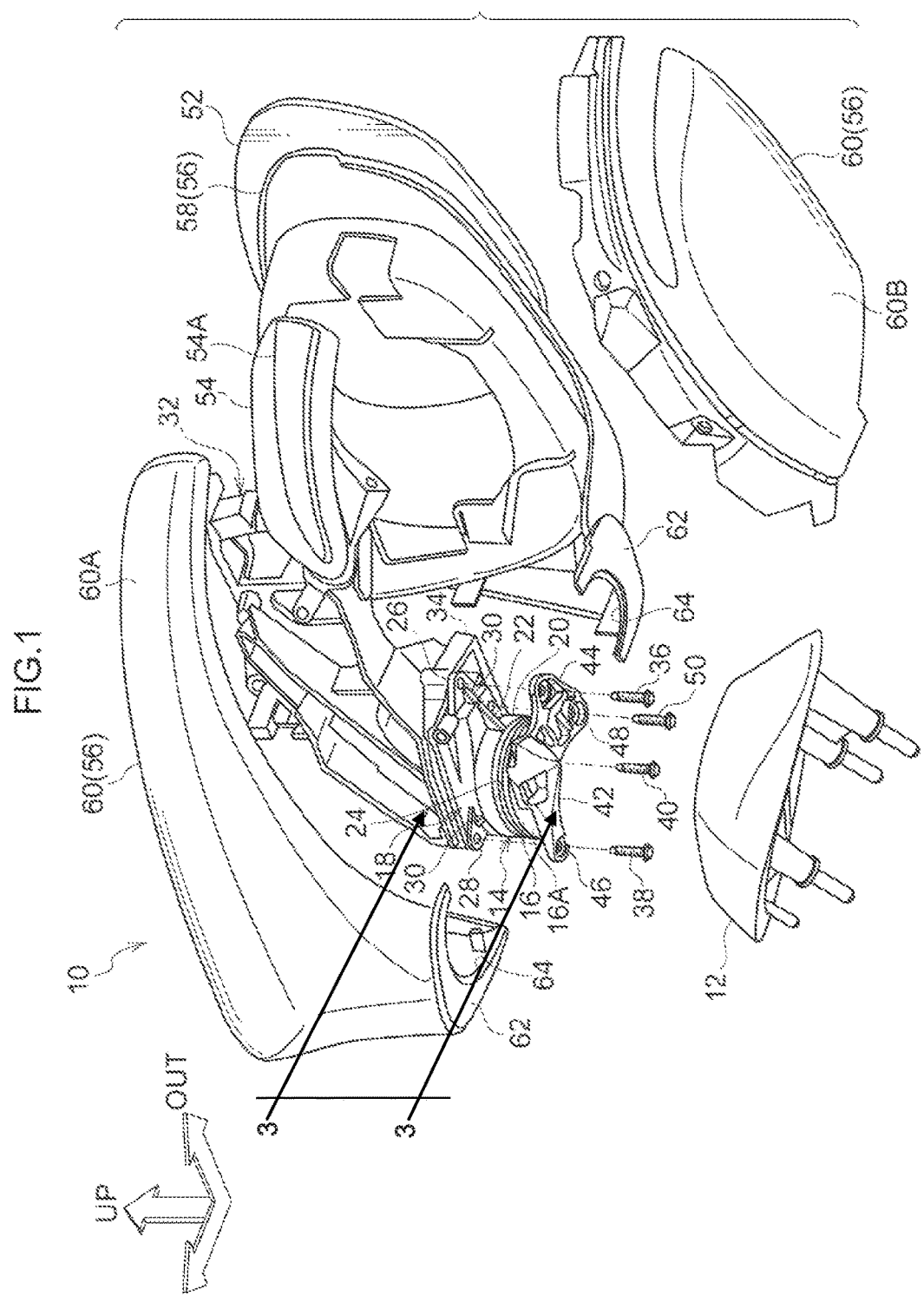
FIG. 1 is an exploded perspective view showing a vehicle door mirror device according to an exemplary embodiment of the present invention as viewed from a vehicle front diagonal lower side.

FIG. 1 is an exploded perspective view showing a vehicle door mirror device 10 according to an exemplary embodiment applied with a vehicle mirror device of the present invention, as viewed from a front diagonal lower side of the vehicle. Note that in the drawings, the arrow FR indicates the front of the vehicle, the arrow OUT indicates the vehicle width direction outside (the left of the vehicle), and the arrow UP indicates upwards.

The vehicle door mirror device 10 according to the present exemplary embodiment is installed to an external portion of a vehicle front side end of an up-down direction intermediate portion of a vehicle door (a front side door, not shown in the drawings).

As shown in FIG. 1, the vehicle door mirror device 10 is provided with a stay 12 serving as a vehicle body side (install body). The vehicle door mirror device 10 is installed to the door sue to the stay 12 being installed to the door.

A stowage mechanism 14 serving as a rotating mechanism is supported at an upper side of the stay 12.

The stowage mechanism 14 is provided with a stand 16 that is made from metal and serves as an attachment member. A substantially circular plate shaped assembly portion 16A is provided at a lower end of the stand 16, and the assembly portion 16A is assembled (fixed) to the stay 12, thereby supporting the stowage mechanism 14 on the stay 12. At the upper side of the assembly portion 16A, a circular cylinder shaped shaft (not shown in the drawings) serving as a support portion is integrally formed. The shaft extends upwards from the assembly portion 16A.

The stowage mechanism 14 is provided with a substantially rectangular box shaped case 18 that is made from resin and serves as a rotating portion.

At a vehicle width direction inside portion of a bottom wall (lower wall) of the case 18, a projecting portion 20 that has a substantially circular cylinder shape with a bottom is integrally formed. The projecting portion 20 projects out from the case 18 towards the lower side (the assembly portion 16A side). The projecting portion 20 is coaxially penetrated by the shaft of the stand 16, and the case 18 is supported by the shaft so as to be capable of rotating. A triangular plate shaped reinforcement rib 22 serving as a reinforcement portion is integrally formed between an upper side portion of the vehicle width direction outside end of the projecting portion 20 and a vehicle width direction outside portion of the bottom wall of the case 18. The reinforcement rib 22 reinforces the projecting portion 20. At a lower portion of a peripheral wall of the projecting portion 20, a recessed portion 24 that has a rectangular cross-section and serves as an anchor portion is formed. The recessed portion 24 is disposed around the entire circumferential direction of the projecting portion 20 and is open towards the projecting portion 20 radial direction outside.

At a lower end portion of the peripheral wall of the case 18, a triangular plate shaped first fixing plate 26, second fixing plate 28, and third fixing plate (not shown in the drawings) that serve as fixing portions are integrally formed. The first fixing plate 26 projects towards the vehicle width direction outside from a vehicle width direction outside face of the case 18. The second fixing plate 28 projects from a vehicle width direction inside and vehicle front side face of the case 18 towards the vehicle width direction inside and the vehicle front side. The third fixing plate projects from a vehicle width direction inside and vehicle rear side face of the case 18 towards the vehicle width direction inside and the vehicle rear side. Triangular plate shaped ribs 30 that respectively serve as reinforcement portions are integrally formed between projection base end side portions of the first fixing plate 26, the second fixing plate 28 and the third fixing plate, and the peripheral wall of the case 18. The ribs 30 respectively reinforce the first fixing plate 26, the second fixing plate 28, and the third fixing plate.

A motor (not shown in the drawings) serving as a drive section and a gear mechanism (not shown in the drawings) are housed inside the case 18. The gear mechanism is actuated by drive of the motor on actuation of the stowage mechanism 14, thereby rotating the case 18 about an axis of the shaft of the stand 16.

A substantially plate shaped bracket 32 made from resin is provided as a support body at an upper side of the case 18. The bracket 32 is elongated in the vehicle width direction. A substantially rectangular tube shaped housing sleeve 34 that serves as a housing portion is formed at a vehicle width direction inside portion of the bracket 32. The inside of the housing sleeve 34 is open towards the lower side.

The case 18 is housed inside the housing sleeve 34 from the lower side (from the assembly portion 16A side). At an up-down direction intermediate portion of the case 18, an up-down direction intermediate portion of the housing sleeve 34 is fixed by screw fastening. The first fixing plate 26, the second fixing plate 28 and the third fixing plate of the case 18 are respectively fastened and fixed to the peripheral wall of the housing sleeve 34 from the lower side by a first screw 36, a second screw 38 and a fixing screw 40 that serve as fixing members. The case 18 is thereby fixed to a vehicle width direction inside portion of the bracket 32, with the first fixing plate 26, the second fixing plate 28 and the third fixing plate of the case 18 in face-contact with a lower face of the housing sleeve 34.

Figure 2A:
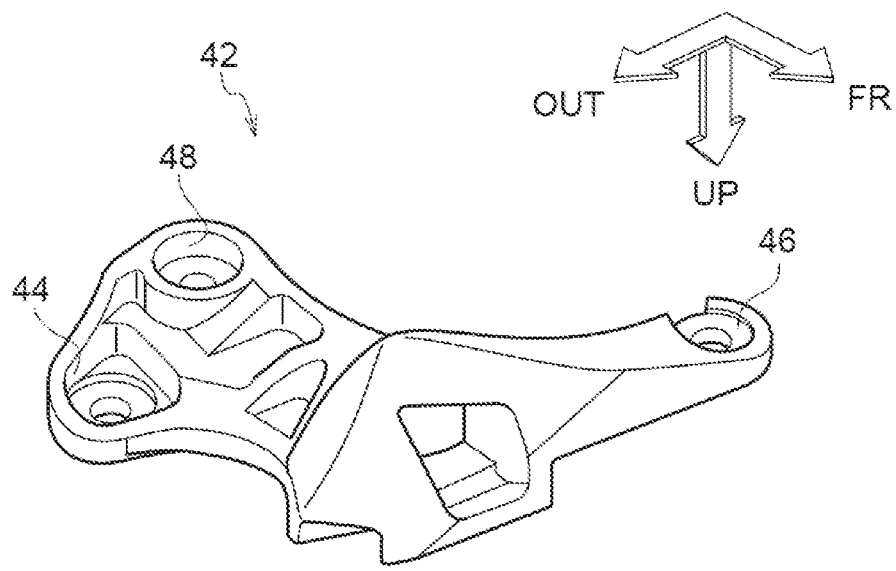
FIG. 2A and FIG. 2B are drawings showing reinforcement of the vehicle door mirror device according to the present exemplary embodiment.
Figure 2B:
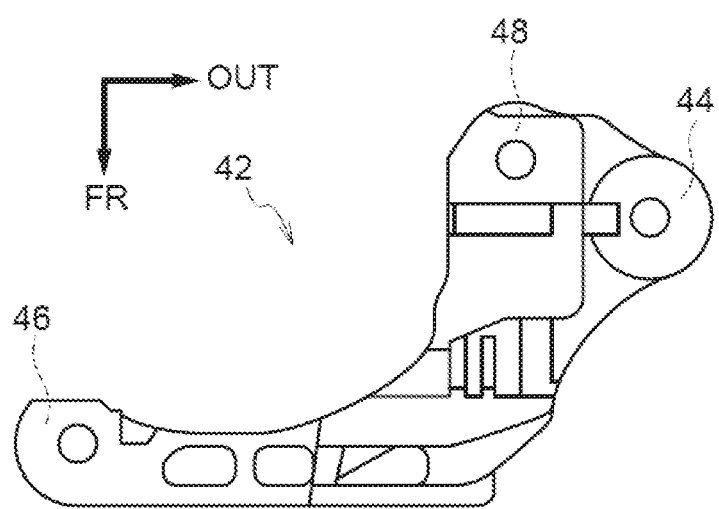

Resin reinforcement 42 (see FIG. 2A and FIG. 2B) has an L-shaped block profile, and serves as a restriction member, and the reinforcement 42 is provided at a lower side of the case 18. The reinforcement 42 is disposed at the vehicle width direction outside and vehicle front side of the projecting portion 20 of the case 18.

A first recessed portion 44, a second recessed portion 46, and a third recessed portion 48, that are each substantially circular in shape, are formed respectively at a vehicle width direction outside end, a vehicle width direction inside end, and a vehicle rear side end of a lower face of the reinforcement 42. The first recessed portion 44, the second recessed portion 46 and the third recessed portion 48 are open towards the lower side. Moreover, upper faces on the upper sides of the first recessed portion 44, the second recessed portion 46 and the third recessed portion 48 of the reinforcement 42 are respectively configured in flat plane shapes.

Figure 3:
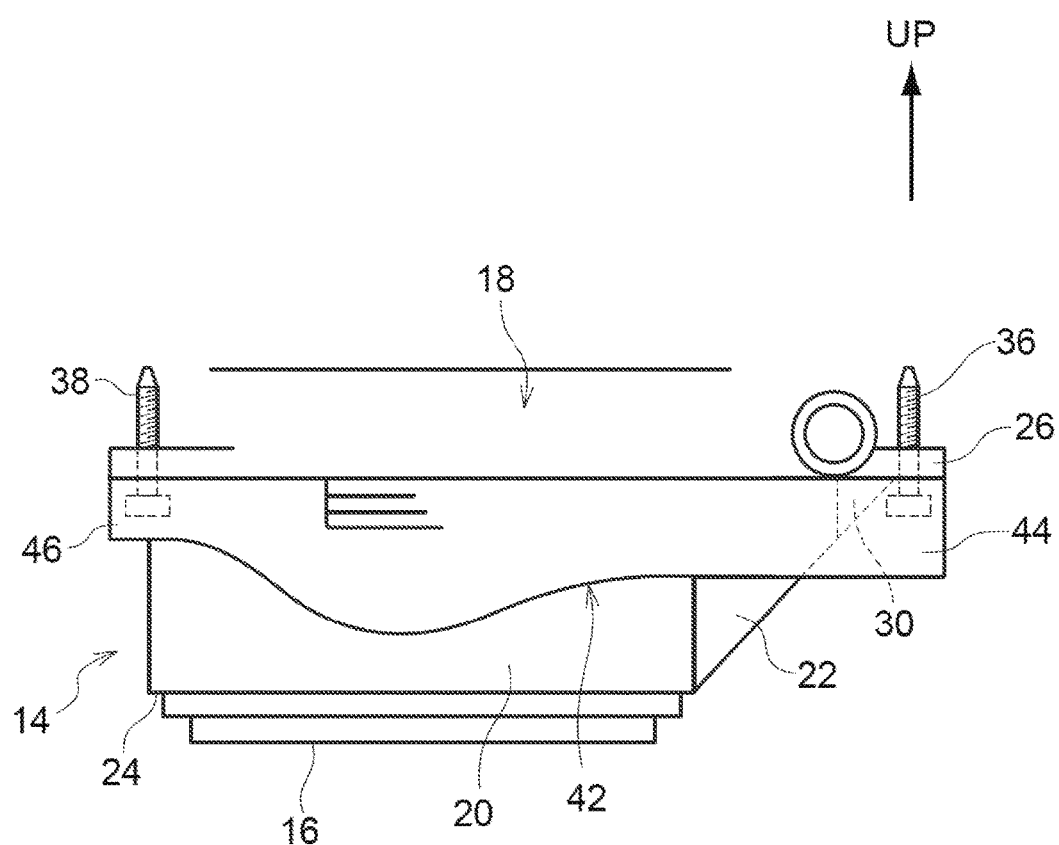
FIG. 3 is a partial side view of the vehicle door mirror device shown in FIG. 1 along the lines 3-3 in an assembled state.

With reference to FIG. 1 and FIG. 3, the first recessed portion 44 is fastened and fixed to the peripheral wall of the housing sleeve 34 of the bracket 32 from the lower side together with the first fixing plate 26 of the case 18 by the first screw 36. The second recessed portion 46 is fastened and fixed to the peripheral wall of the housing sleeve 34 of the bracket 32 from the lower side together with the second fixing plate 28 of the case 18 by the second screw 38. The third recessed portion 48 is fastened and fixed to a portion, at a vehicle width direction outside and vehicle rear side, of the bottom wall of the case 18 from the lower side by a third screw 50 that serves as a fixing member. As shown in FIG. 3, the reinforcement 42 is thereby fixed at the lower side of the housing sleeve 34 and the case 18, with the upper faces which are at the upper side of the first recessed portion 44, the second recessed portion 46 and the third recessed portion 48 (not shown) of the reinforcement 42 respectively being in face-contact with the first fixing plate 26, the second fixing plate 28 (not shown) and the bottom wall of the case 18. The reinforcement 42 is moreover disposed further to the upper side than the recessed portion 24 of the projecting portion 20 of the case 18.

An adjustment mechanism (not shown in the drawings) is fixed to a vehicle width direction outside portion of the bracket 32 on the vehicle rear side. A back face side portion of a substantially rectangular plate shaped mirror 52 is attachably and detachably assembled to a vehicle rear side of the adjustment mechanism. A mirror face (front face) of the mirror 52 faces towards the vehicle rear side, such that an occupant of the vehicle (such as the driver) is able to use the mirror 52 to see the rear side of the vehicle. Actuation of the adjustment mechanism tilts the mirror 52 and adjusts the angle of the mirror face of the mirror 52.

A turn lamp 54 serving as an additional mechanism is fixed to a vehicle width direction outside and lower side portion of the bracket 32 on the vehicle front side. A vehicle front side portion of the turn lamp 54 is provided with a lamp lens 54A serving as an illuminating portion. The lamp lens 54A flashes on and off based on specific operation by the occupant when for example the occupant alters the vehicle travel direction.

The case 18, the bracket 32, the reinforcement 42, the adjustment mechanism, the mirror 52 and the turn lamp 54 are covered by a visor 56 that is made from resin and serves as a covering member. The visor 56 is assembled to the bracket 32. A vehicle rear side portion of the visor 56 is provided with a substantially rectangular tube shaped visor rim 58. The visor rim 58 covers the entire periphery of the mirror 52 and exposes the mirror face of the mirror 52 on the vehicle rear side. A vehicle front side portion of the visor 56 is provided with a substantially rectangular parallelopiped container shaped visor cover 60. The visor cover 60 is configured by an upper visor cover 60A on the upper side and a lower visor cover 60B on the lower side. The inside of the visor cover 60 is open towards the vehicle rear side, and the visor cover 60 is joined to the visor rim 58.

A lower end of a vehicle width direction inside end portion of the visor 56 is provided with an anchor plate 62 that has a substantially flat plate shape and serves as an anchor portion. A circular shaped anchor hole 64 is formed penetrating the anchor plate 62. The anchor plate 62 and the anchor hole 64 are provided split between the visor rim 58 and the visor cover 60 (the upper visor cover 60A). The anchor plate 62 is anchored to the projecting portion 20 by fitting the anchor plate 62 into the recessed portion 24 of the projecting portion 20 of the case 18 at an edge portion of the entire periphery of the anchor hole 64.

The visor cover 60 (the lower visor cover 60B) is penetrated by the lamp lens 54A of the turn lamp 54, with the lamp lens 54A being exposed to the vehicle front side of the visor cover 60.

Explanation follows regarding operation of the present exemplary embodiment.

In the vehicle door mirror device 10 configured as described above, actuation of the stowage mechanism 14 rotates the case 18 about an axis of the shaft of the stand 16, such that the mirror 52 (including the bracket 32, the reinforcement 42, the adjustment mechanism, the turn lamp 54 and the visor 56) rotates integrally with the case 18. The mirror 52 is accordingly stowed (folded) in by rotating the mirror 52 towards the vehicle rear side and the vehicle width direction inside. Moreover, the stowed mirror 52 stands out (returns) to the vehicle width direction outside by rotating the mirror 52 towards the vehicle front side and the vehicle width direction outside.

Note that the case 18 is housed in the housing sleeve 34 of the bracket 32 from the lower side (the assembly portion 16A side of the stand 16).

The reinforcement 42 is fixed to the case 18 at the first recessed portion 44, the second recessed portion 46 and the third recessed portion 48 by the first screw 36, the second screw 38 and the third screw 50 respectively, with the reinforcement 42 being disposed to the lower side of the case 18. The reinforcement 42 accordingly reinforces a lower side portion of the case 18, restricting deformation of the lower side portion of the case 18. Vibration deformation of the lower portion of the case 18 due to for example vibration of the vehicle can accordingly be suppressed, enabling the occurrence of chattering of the mirror 52 to be suppressed.

Further, the reinforcement 42 is fixed to the first fixing plate 26 and the second fixing plate 28 of the case 18 by the first screw 36 and the second screw 38 respectively. The reinforcement 42 can accordingly restrict deformation of the first fixing plate 26 and the second fixing plate 28 that are low rigidity locations of the lower side portion of the case 18, enabling vibration deformation of the lower portion of the case 18 due to for example vibration of the vehicle to be effectively suppressed, and enabling the occurrence of chattering of the mirror 52 to be effectively suppressed.

Further, the lower side portion of the case 18 is fixed to the peripheral wall of the housing sleeve 34 by the first screw 36 and the second screw 38. The housing sleeve 34 can accordingly reinforce the lower side portion of the case 18, thereby enabling deformation of the lower side portion of the case 18 to be restricted, enabling vibration deformation of the lower side portion of the case 18 due to for example vibration of the vehicle to be further suppressed, and enabling the occurrence of chattering of the mirror 52 to be further suppressed.

Moreover, the first fixing plate 26 and the second fixing plate 28 of the case 18 are fixed to the peripheral wall of the housing sleeve 34 by the first screw 36 and the second screw 38. The housing sleeve 34 can accordingly restrict deformation of the first fixing plate 26 and the second fixing plate 28 that are low rigidity locations of the lower side portion of the case 18, enabling vibration deformation of the lower side portion of the case 18 due to for example vibration of the vehicle to be even more effectively suppressed, and enabling the occurrence of chattering of the mirror 52 to be even more effectively suppressed.

The reinforcement 42 is configured substantially in an L-shape as seen in plan view, and extends around the circumferential direction of the projecting portion 20 of the case 18 (around the circumferential direction of rotation of the case 18). The reinforcement 42 can accordingly restrict deformation of the lower side portion of the case 18 even more effectively, enabling vibration deformation of the lower side portion of the case 18 due to for example vibration of the vehicle to be even more effectively suppressed, and enabling the occurrence of chattering of the mirror 52 to be even more effectively suppressed.

Further, the reinforcement 42 is disposed at the vehicle front side of the case 18 (on the opposite side to the mirror 52 and the adjustment mechanism). The reinforcement 42 can accordingly effectively restrict vehicle front-rear direction vibration deformation of the lower side portion of the case 18, that is caused by load of the mirror 52 and the adjustment mechanism that are disposed at the vehicle rear side of the case 18 and that are heavier compared with the bracket 32 and the visor 56. Vibration deformation of the lower side portion of the case 18 due to for example vibration of the vehicle can accordingly be even more effectively suppressed, enabling the occurrence of chattering of the mirror 52 to be even more effectively suppressed.

Moreover, the reinforcement 42 is fixed to the case 18 in the vehicle width direction (the standing out direction of the mirror 52, the rotation radial direction of the case 18) at plural locations (3 locations in the present exemplary embodiment) by the first screw 36, the second screw 38 and the third screw 50. The reinforcement 42 can accordingly effectively restrict vehicle width direction vibration deformation of the lower side portion of the case 18, that is caused by load of the bracket 32, the adjustment mechanism, the mirror 52, the turn lamp 54 and the visor 56 that are many disposed to the vehicle width direction outside of the case 18. Vibration deformation of the lower side portion of the case 18 due to for example vibration of the vehicle can accordingly be even more effectively suppressed, enabling the occurrence of chattering of the mirror 52 to be even more effectively suppressed.

Moreover, the recessed portion 24 of the projecting portion 20 of the case 18 is disposed further to the lower side than the reinforcement 42, and the edge portion of the anchor hole 64 of the anchor plate 62 in the visor 56 is anchored to the recessed portion 24. In contrast to a case in which the anchor plate 62 is anchored to the reinforcement 42, in the vehicle door mirror device 10, the portion of the projecting portion 20 to which the anchor plate 62 is anchored can accordingly be prevented from becoming thicker, which would lead to an increase in size, due to the reinforcement 42. The design of this portion of the projecting portion 20 can accordingly be varied with ease, thus enabling an increase in the degrees of freedom for design of the vehicle door mirror device 10.

Note that in the present exemplary embodiment, the reinforcement 42 is fixed to the case 18 and the bracket 32 (the housing sleeve 34). However configuration may be made wherein the reinforcement 42 is fixed to one of the case 18 or the bracket 32 (in particular the housing sleeve 34).

Moreover in the present exemplary embodiment, the reinforcement 42 is fixed to at least one of the case 18 and the bracket 32 (the housing sleeve 34) by the first screw 36, the second screw 38 and the third screw 50. However configuration may be made wherein the reinforcement 42 is fixed to at least one of the case 18 and the bracket 32 (in particular the housing sleeve 34) by for example engaging with a screw or a hook.

In the present exemplary embodiment, the reinforcement 42 is disposed at the vehicle front side and the vehicle width direction outside (a part of the circumferential direction of rotation) of the case 18. However configuration may be made such that the reinforcement 42 is disposed on another side of the case 18, or such that the reinforcement 42 is disposed around the entire circumferential direction of rotation of the case 18.

In the present exemplary embodiment, the vehicle mirror device of the present invention is applied to the vehicle door mirror device 10. However the vehicle mirror device of the present invention may be applied to another vehicle outer mirror device on the vehicle exterior (for example a vehicle fender mirror device), or applied to a vehicle inner mirror device of the vehicle interior.

What is claimed is:

1. A vehicle mirror device comprising:
    a rotating mechanism having a stand, the stand including an assembly portion that is assembled to a vehicle body side, and the rotating mechanism having a rotating portion that is capable of rotating with respect to the assembly portion, the rotating portion including a bottom wall portion provided at a bottom portion, which is at a side of the assembly portion, of the rotating portion;
    a substantially cylinder-shaped projecting portion that projects from the bottom wall portion of the rotating portion toward an assembly portion side, the stand being inserted in the projecting portion such that the rotation portion is rotatable with respect to the stand;
    a support body at which a housing portion in which the rotating portion is housed from the side of the assembly portion is provided, that supports a vehicle mirror, and that is rotated by rotating the rotating portion with respect to the assembly portion such that the mirror is stowed in or stands out; and
    a restriction member that is disposed at the rotating portion at the side of the assembly portion and that contacts with the bottom wall portion of the rotating portion, and that restricts deformation of a portion of the rotating portion at the side of the assembly portion, the restriction member rotating integrally with the rotation portion, and facing at least a portion of a peripheral wall of the projecting portion in a direction perpendicular to an axis direction of the stand,
    wherein the restriction member is a separate member from the support body and the housing portion.

2. The vehicle mirror device of claim 1, wherein the portion of the rotating portion at the side of the assembly portion is fixed to the support body.

3. The vehicle mirror device of either claim 1, wherein the restriction member extends around a circumferential direction of rotation of the rotating portion.

4. The vehicle mirror device of either claim 2, wherein the restriction member extends around a circumferential direction of rotation of the rotating portion.

5. The vehicle mirror device of claim 1, wherein the restriction member is disposed at the rotating portion at a side opposite to a side of the mirror.

6. The vehicle mirror device of claim 2, wherein the restriction member is disposed at the rotating portion at a side opposite to a side of the mirror.

7. The vehicle mirror device of claim 1, wherein the restriction member is fixed to the rotating portion at a plurality of locations in a standing out direction of the mirror.

8. The vehicle mirror device of claim 2, wherein the restriction member is fixed to the rotating portion at a plurality of locations in a standing out direction of the mirror.

9. The vehicle mirror device of claim 1, wherein the projecting portion provided at the bottom wall portion of the rotating portion projects further towards the side of the assembly portion than the restriction member; and further comprising:
a covering member that is anchored to a portion of the projecting portion, which is further to the side of the assembly portion than the restriction member, and that covers the support body.

10. The vehicle mirror device of claim 2, wherein the: projecting portion provided at the bottom wall portion of the rotating portion projects further towards the side of the assembly portion than the restriction member; and further comprising:
a covering member that is anchored to a portion of the projecting portion, which is further to the side of the assembly portion than the restriction member, and that covers the support body.

11. The vehicle mirror device of claim 1, wherein the restriction member and the bottom wall portion of the rotating portion are separate members.

12. The vehicle mirror device of claim 11, wherein the bottom wall portion of the rotating portion is sandwiched between the restriction member and the support body.

13. The vehicle mirror device of claim 1, wherein the restriction member is disposed further to the bottom wall portion side than a projecting end portion of the projecting portion.

14. The vehicle mirror device of claim 1, wherein the housing portion has an opening facing the side of the assembly portion, the opening being configured such that a part of the rotation portion, which part is at a side opposite to the side of the assembly portion is housed inside said opening of the housing portion from the side of the assembly portion.

15. The vehicle mirror device of claim 14, the housing portion has a tube-shaped portion terminating in said opening.

16. A vehicle mirror device comprising:
a rotating mechanism having a stand, the stand including an assembly portion that is assembled to a vehicle body side, and the rotating mechanism having a rotating portion that is capable of rotating with respect to the assembly portion, the rotating portion including a bottom edge, and a bottom wall portion provided above said bottom edge which faces a side of the assembly portion;

a substantially cylinder-shaped projecting portion that projects from the bottom wall portion of the rotating portion toward an assembly portion side, the stand being inserted in the projecting portion such that the rotation portion is rotatable with respect to the stand;

a support body at which a housing portion in which the rotating portion is housed from the side of the assembly portion is provided, that supports a vehicle mirror, and that is rotated by rotating the rotating portion with respect to the assembly portion such that the mirror is stowed in or stands out; and a restriction member that is disposed at the rotating portion at the side of the assembly portion and that contacts with the bottom wall portion of the rotating portion, and that restricts deformation of a portion of the rotating portion at the side of the assembly portion, the restriction member rotating integrally with the rotation portion, and facing at least a portion of a peripheral wall of the projecting portion in a direction perpendicular to an axis direction of the stand, wherein the restriction member is a separate member from the support body and the housing portion.

* * * * *